United States Patent [19]

Rogers

[11] Patent Number: 5,592,370
[45] Date of Patent: Jan. 7, 1997

[54] REGULATED COMPLEMENTARY CHARGE PUMP CIRCUIT

[75] Inventor: Alan C. Rogers, Palo Alto, Calif.

[73] Assignee: Sun Microsystems, Inc., Mountain View, Calif.

[21] Appl. No.: 308,748

[22] Filed: Sep. 19, 1994

[51] Int. Cl.[6] .............................. H02M 3/18; H02M 7/00
[52] U.S. Cl. .................................................. 363/60
[58] Field of Search ........................................ 363/59, 60

[56] References Cited

U.S. PATENT DOCUMENTS

| | | | |
|---|---|---|---|
| 4,752,699 | 6/1988 | Cranford, Jr. et al. | 307/297 |
| 4,857,866 | 8/1989 | Tateishi | 331/1 A |
| 5,239,455 | 8/1993 | Fobbester et al. | 363/60 |
| 5,334,951 | 8/1994 | Hogeboom | 331/1 A |
| 5,375,148 | 12/1994 | Parker et al. | 375/120 |
| 5,394,320 | 2/1995 | Blodgett | 363/60 |
| 5,410,465 | 4/1995 | Tan | 363/60 |

Primary Examiner—Peter S. Wong
Assistant Examiner—Bao Q. Vu
Attorney, Agent, or Firm—Blakely Sokoloff Taylor & Zafman LLP

[57] ABSTRACT

A charge pump circuit contains a first switch pass gate, a second switch pass gate, a high node regulator, and a low node regulator. The first switch pass gate couples a high node to a charge pump output when an up control signal is active, and the second switch pass gate couples a low node to the charge pump output when a down control signal is active. The high node regulator receives the charge pump output and a source voltage for the charge pump circuit, and generates a high node voltage at the high node such that the high node voltage is regulated to a voltage above a predetermined margin of the charge pump output. The low node regulator is coupled to ground, and receives the charge pump output to generate a low node voltage at the low node that is regulated to a voltage below a predetermined margin of the charge pump output. The charge pump circuit has application for use in a phase lock loop.

15 Claims, 6 Drawing Sheets

REGULATED COMPLEMENTARY CHARGE PUMP CIRCUIT

FIELD OF THE INVENTION:

The present invention relates to charge pump circuits, and more specifically to methods and apparatus for a regulated complementary charge pump circuit.

BACKGROUND OF THE INVENTION:

FIG. 1 illustrates a prior art charge pump circuit and loop capacitor. The charge pump circuit includes a pullup leg 20, a pulldown leg 10 and a gain resistor implemented with p-channel transistor 30 and n-channel transistor 40. In order to place a charge on the loop capacitor 50, the up control signal causes the pullup leg 20 to couple the voltage source, $V_{cc}$ to node 1. In order to dissipate charge from the loop capacitor 50, the down control signal causes the pulldown leg 10 to couple node 1 to ground. In general, the gain resistor regulates the rate that charge is provided and dissipated to and from the loop capacitor 50. The p-channel transistor 30 and n-channel transistor 40 generate a resistance between nodes 1 and 2 to provide an appropriate charge at node 2 for the loop capacitor 50.

Charge pump circuits have application for use in phase lock loops. In some charge pump circuits, a pair of transistors for the pullup leg 20 and the pulldown leg 10 are implemented. Typically, integrated circuit process techniques dictate that the transistors have narrow channel widths and long channel lengths. If the pullup and pulldown transistors are constructed with narrow channel width and long channel lengths, then large parasitic capacitances result. The large parasitic capacitances result in uncontrolled portions of charge injected into the loop capacitor 50.

Because pullup leg 20 and pulldown leg 10 exhibit large amounts of parasitic capacitance, the loop capacitor 50 is made relatively large in comparison with the parasitic capacitance generated by the charge pump circuit. Because of this, loop capacitors are typically implemented off-chip. However, it is desirable to reduce the size of the loop capacitor 50, thereby permitting implementation of the loop capacitor on-chip. Other charge pump circuits utilize more elaborate schemes, wherein the pullup leg 20 and the pulldown leg 10 have series current limits. However, for on-chip phase lock loop applications, the more sophisticated embodiments typically result in even worse performance.

In addition to generating parasitic capacitances, the pullup leg 20 and the pulldown leg 10 do not provide simultaneous switching of the control signals (i.e. the pullup leg 20 does not turn on at the same time the pulldown leg 10 turns off, and the pullup leg 20 does not turn off at the same time the pulldown leg 10 turns on). The non-simultaneous switching results in both the pullup leg 20 and the pulldown leg 10 conducting current at the same time. Therefore, the non-simultaneous switching of the control signals exacerbates the problem of additional charge being injected onto the loop capacitor 50. Furthermore, the pullup leg 20 and the pulldown leg 10 operate based on intrinsic dependence on the operating point of the transistor devices. Therefore, it is desirable to construct a charge pump circuit that provides simultaneous switching and is not dependent on the operating point of the transistor devices.

In the prior art circuit shown in FIG. 1, the gain resistors, implemented with p-channel transistor 30 and n-channel transistor 40, generate further parasitic capacitances. In order to illustrate the additional parasitic capacitances generated by the gain resistance, capacitors 55, 60, 65, and 70 are shown. The capacitances, $C_p$, cause frequency limitations within the charge pump circuit. The effect of the frequency limitations results in slow rise and fall times for charging and discharging the loop capacitor 50.

The adverse effects of slow rise times are exacerbated when corrections occur in a phase lock loop for small phase differences. Furthermore, slow rise and fall times cause lazy transient behavior resulting in a deadband. The deadband alters charge transfer characteristics resulting in a large static offset as well as large jitter for the output of the phase lock loop circuit. For a high frequency clock signal, e.g. above 200 megahertz (MHz), the percentage of jitter due to the deadband becomes unsatisfactory. Consequently, it is desirable to eliminate the deadband or lazy transient behavior of a phase lock loop caused from the gain resistance.

SUMMARY OF THE INVENTION

A charge pump circuit contains a first switch pass gate, a second switch pass gate, a high node regulator, and a low node regulator. The first switch pass gate couples a high node to a charge pump output for the charge pump circuit. The first switch pass gate receives an up control signal, and couples the high node to a charge pump output when the up control signal is active. The second switch pass gate couples a low node and the charge pump output. The second switch pass gate receives a down control signal, and couples the low node to the charge pump output when the down control signal is active.

The high node regulator receives the charge pump output and a source voltage for the charge pump circuit. In turn, the high node regulator generates a high node voltage at the high node such that the high node voltage is regulated to a voltage above a predetermined margin of the charge pump output. The low node regulator is coupled to ground, and receives the charge pump output to generate a low node voltage at the low node. The low node voltage is regulated to a voltage below a predetermined margin of the charge pump output.

In one embodiment, the high node regulator contains two p-channel transistors, and the low node regulator contains two n-channel transistors. The two p-channel transistors maintain the high node voltage one p-channel threshold voltage above the charge pump output. The two n-channel transistors maintain the low node voltage one n-channel threshold voltage below the charge pump output.

The regulation of the voltage between the high node and the low node in the charge pump circuit results in improved operation for the charge pump circuit. The high node regulator and the low node regulator effectively reduce the voltage across the high node and low node. By reducing the voltage across the high node and low node, the voltages across the first pass gate and the second pass gate are also reduced, thereby effectively reducing the gain of the charge pump circuit. The low gain of the charge pump circuit results in generation of a small amount of charge. As the high node voltage approaches the voltage at the charge pump output, and as the low node voltage approaches the voltage at the charge pump output, the operation of the charge pump circuit approaches ideal conditions.

In one embodiment, the first switch pass gate and the second switch pass gate are constructed as complementary switches. Each complementary switch contains a complementary metal oxide semiconductor (CMOS) inverter, a p-channel transistor, and a n-channel transistor. In addition, the gain resistance for the charge pump circuit is implemented within the p-channel and n-channel transistors, thereby eliminating the need for an additional gain resistor stage.

The low gain of the charge pump circuit reduces the amount of charge across the MOS transistors, thereby reducing parasitic capacitances generated from the first and second switch pass gates. In addition, the low gain of the charge pump circuit results in relatively high immunity to operating point variations in the first and second switch pass gates. Furthermore, the small amount of charge generated by the charge pump circuit facilitates the implementation of a small on-chip loop capacitor.

The charge pump circuit has application for use in a phase lock loop. The phase lock loop includes a phase/frequency detector, the charge pump circuit including damping, a loop capacitor, and a voltage controlled oscillator. The phase/frequency detector receives two frequency signals, and generates an up control signal and a down control signal representing a phase difference between the two frequency signals. The charge pump circuit receives the up control signal and the down control signal, and generates charge at a charge pump output in accordance with the up and down control signals. The loop capacitor accumulates charge output from the charge pump circuit. The voltage controlled oscillator generates an output frequency locked to the first of the two frequency signals based on the charge stored in the loop capacitor. The charge pump circuit facilitates the implementation of the "on-chip" loop capacitor.

Other features and advantages of the present invention will be apparent from the accompanying drawings, and from the detailed description that follows below.

BRIEF DESCRIPTION OF THE DRAWINGS

The features and advantages of the present invention will be apparent from the following detailed description of the preferred embodiment of the invention with references to the following drawings.

DETAILED DESCRIPTION

Figure 2:
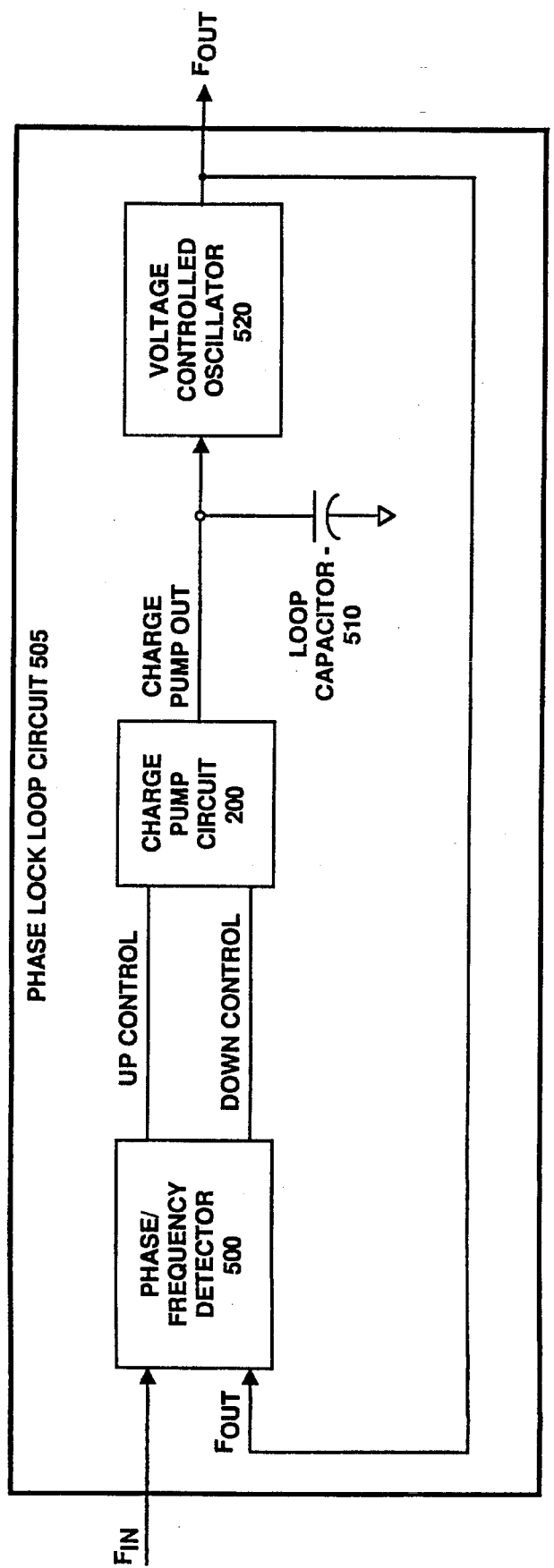
FIG. 2 illustrates a phase lock loop incorporating the charge pump circuit of the present invention.

FIG. 2 illustrates a phase lock loop (PLL) incorporating the charge pump circuit of the present invention. A phase lock loop circuit 505 contains a phase/frequency detector 500, a charge pump circuit 200 of the present invention, a loop capacitor 510 and a voltage controlled oscillator 520. In general, the phase lock loop circuit 505 receives, as an input, a frequency ($F_{IN}$), and generates, as an output, an output frequency ($F_{OUT}$). The phase lock loop circuit 505 locks the phase between the $F_{IN}$ signal and the $F_{OUT}$ signal.

In operation, the phase/frequency detector 500 receives both the $F_{IN}$ and $F_{OUT}$ signals. In accordance with the phase difference of the signals, the phase/frequency detector 500 generates the up control and the down control signals. The up control signal, when active, signifies placement of charge on the loop capacitor 510, and the down control signal, when active, signifies depletion of charge from the loop capacitor 510. The phase/frequency detector 500 is intended to represent a broad category of phase detectors used in phase lock loops, which are well known in the art and will not be described further.

The charge pump output is coupled to the loop capacitor 510 and the voltage controlled oscillator 520. The voltage controlled oscillator 520 receives, as an input, a voltage representative of the charge stored in the loop capacitor 510. The voltage controlled oscillator 520 generates a $F_{vco}$ signal and adjusts the frequency of the $F_{vco}$ signal in accordance with the charge stored in the loop capacitor 510. The voltage controlled oscillator 520 generates the output frequency, $F_{OUT}$, as the corrected $F_{vco}$ signal. The voltage controlled oscillator 520 is intended to represent a broad category of adjustable oscillators utilized to lock phase and frequencies of two signals, which are well known in the art and will not be described further.

The phase lock loop circuit 505 utilizing the charge pump circuit 200 of the present invention has application for use in high performance on-chip phase lock loops. The on-chip phase lock loops offer the simultaneous benefits of zero delay clock drivers and clock regeneration. The high performance operation required is limited by the use of off chip phase lock loop filter components. With the higher precision required for the higher frequencies, the noise picked up in the loop generated by the off chip PLL filter components becomes unacceptable. Furthermore, a small cost is incurred for providing extra pins, an external component, and assembly which would be required if off chip PLL filter components were needed.

As is described more fully below, the charge pump circuit 200 exhibits low parasitic capacitance and the quantity of charge generated by the charge pump circuit 200 is small. Consequently, the capacitance required for the loop capacitor 510 may also be small. Because the requirement for a large loop capacitance is eliminated, the loop capacitor 510 may be implemented as an on-chip capacitor (e.g. the loop capacitor 510 is fabricated directly on the integrated circuit die with the phase lock loop circuit). By implementing the loop capacitor 510 directly on the integrated circuit die, a high performance phase lock loop is constructed.

Figure 3:
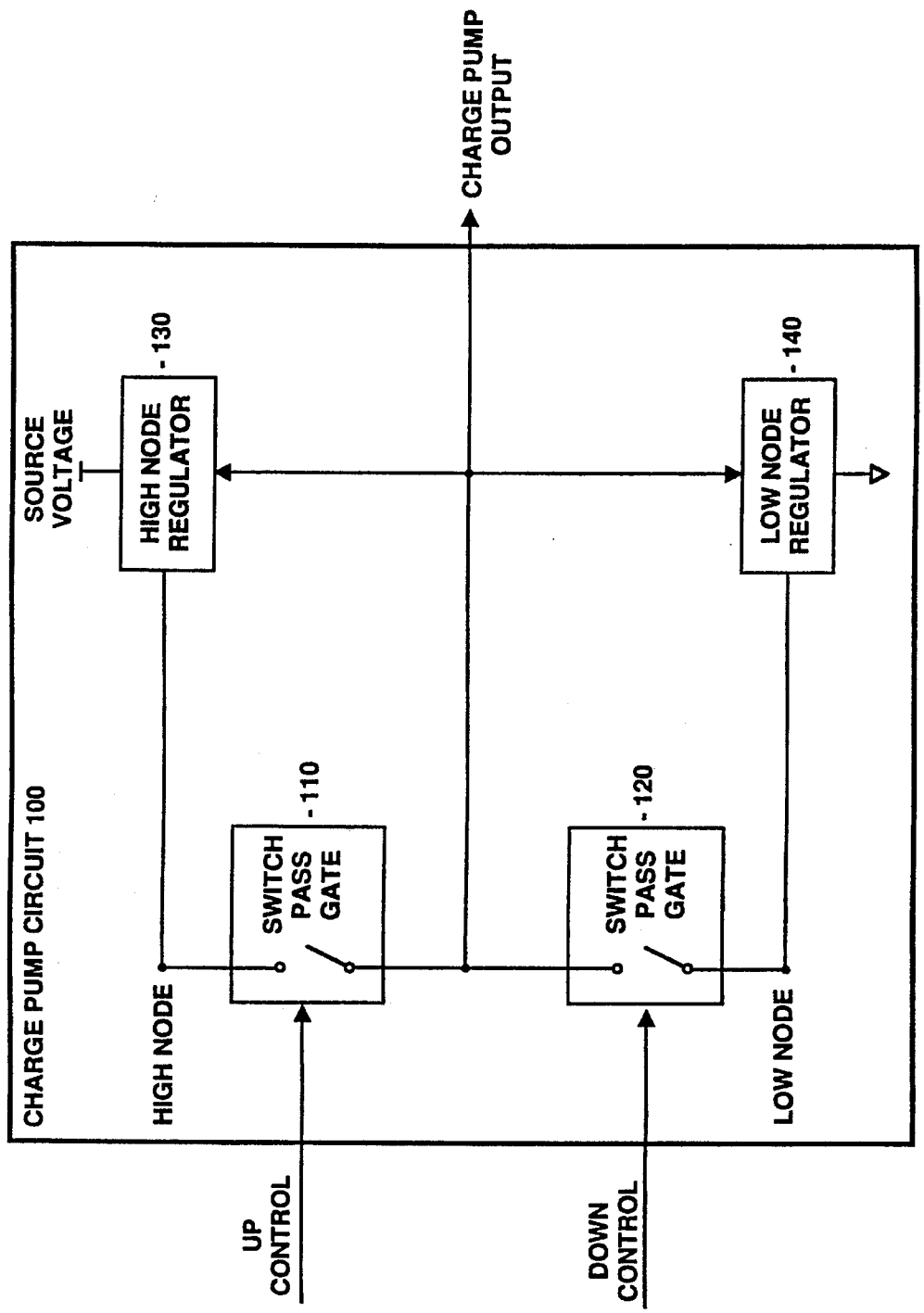
FIG. 3 is a high level block diagram conceptually illustrating the charge pump circuit of the present invention.

FIG. 3 is a high level block diagram conceptually illustrating the charge pump circuit of the present invention. A charge pump circuit 100 receives, as inputs, up control and down control signals, and generates, as an output, a charge pump output. The charge pump circuit of the present invention has application for use in phase lock loops. For the phase lock loop application, the charge pump output is coupled to a loop capacitor, and the up control and down control signals are received from a phase detector extended to the charge pump. An application for the charge pump circuit 100 in a phase lock loop is described more fully below.

The charge pump circuit 100 contains a switch pass gate 110 and a switch pass gate 120. When the switch pass gate 110 receives an active up control signal, the switch pass gate 110 delivers charge to the loop capacitor. When the switch pass gate 120 receives an active down control signal, the switch pass gate 120 dissipates charge from the loop capacitor. Specifically, the switch pass gate 110 is coupled between a high node and the charge pump output, and the switch pass gate 120 is coupled between a low node and the charge pump output. The switch pass gate 110 receives the up control signal, and couples the high node voltage to the charge pump output when the up control signal is active. The switch pass gate 120 receives the down control signal, and couples the charge pump output to the low node to dissipate charge from the loop capacitor.

The charge pump circuit 100 also contains a high node regulator 130 and a low node regulator 140. The high node regulator 130 is coupled to a source voltage for the charge pump circuit 110, and to the high node. In addition, the high node regulator 130 receives the charge pump output, and generates a high node voltage at the high node. The high node voltage is less than the source voltage and is regulated based on the charge pump output. The low node regulator 140 is coupled to ground and to the low node. The low node regulator 140 receives the charge pump output, and generates a low node voltage for the low node. The low node voltage is greater than ground and is regulated based on the charge pump output. Therefore, the charge pump circuit 100 does not directly couple the source voltage and ground to the charge pump output, but couples the high node and the low node to the charge pump output.

A margin voltage is specified for the high node regulator 130 such that the high node voltage is set to the charge pump output voltage minus the predetermined margin voltage. Similarly, a margin voltage is specified for the low node regulator 140 such that the low node voltage is set to the charge pump output voltage plus the predetermined margin voltage.

In operation, the charge pump circuit 100 receives the up control and down control signals. If the up control signal is active, then the switch pass gate 110 is closed to couple the high node to the charge pump output to deliver charge to the charge pump output. As the voltage increases at the charge pump output, the high node regulator 130 also increases the high node voltage at the high node accordingly. If the up control signal is inactive, then the switch pass gate 110 is opened such that no charge is delivered from the high node to the charge pump output.

If an active down control signal is received at the switch pass gate 120, then the switch pass gate 120 couples the charge pump output to the low node to dissipate charge from the charge pump output. As the voltage decreases at the charge pump output, the low node regulator 140 decreases the low node voltage at the low node accordingly. The high node regulators 130 and the high node regulators 140 hold the margin between the voltage at the charge pump output and the high and low nodes to a constant level. Therefore, the relative conduction from the high node path down to the low node path does not change.

The regulation of the voltage between the high node and the low node in the charge pump circuit 100 results in improved operation for the charge pump circuit. The high node regulator 130 and the low node regulator 140 effectively reduce the voltage across the high node and low node. By reducing the voltage across the high node and low node, the voltages across the switch pass gate 110 and switch pass gate 120 are also reduced, thereby effectively reducing the gain of the charge pump circuit 100. The low gain of the charge pump circuit 100 results in generation of a small amount of charge. As the high node voltage approaches the voltage at the charge pump output, and as the low node voltage approaches the voltage at the charge pump output, the operation of the charge pump circuit 100 approaches ideal conditions.

As is explained more fully below, one embodiment for the switch pass gates 110 and 120 utilize metal oxide semiconductor (MOS) transistors. The low gain of the charge pump circuit 100 reduces the amount of charge across the MOS transistors, thereby reducing parasitic capacitances generated from the switch pass gates 110 and 120. In addition, the low gain of the charge pump circuit 100 results in relatively high immunity to operating point variations in the switch pass gates 110 and 120. Furthermore, as is described more fully below, the small amount of charge generated by the charge pump circuit 100 facilitates the implementation of a small on-chip loop capacitor.

Figure 4:
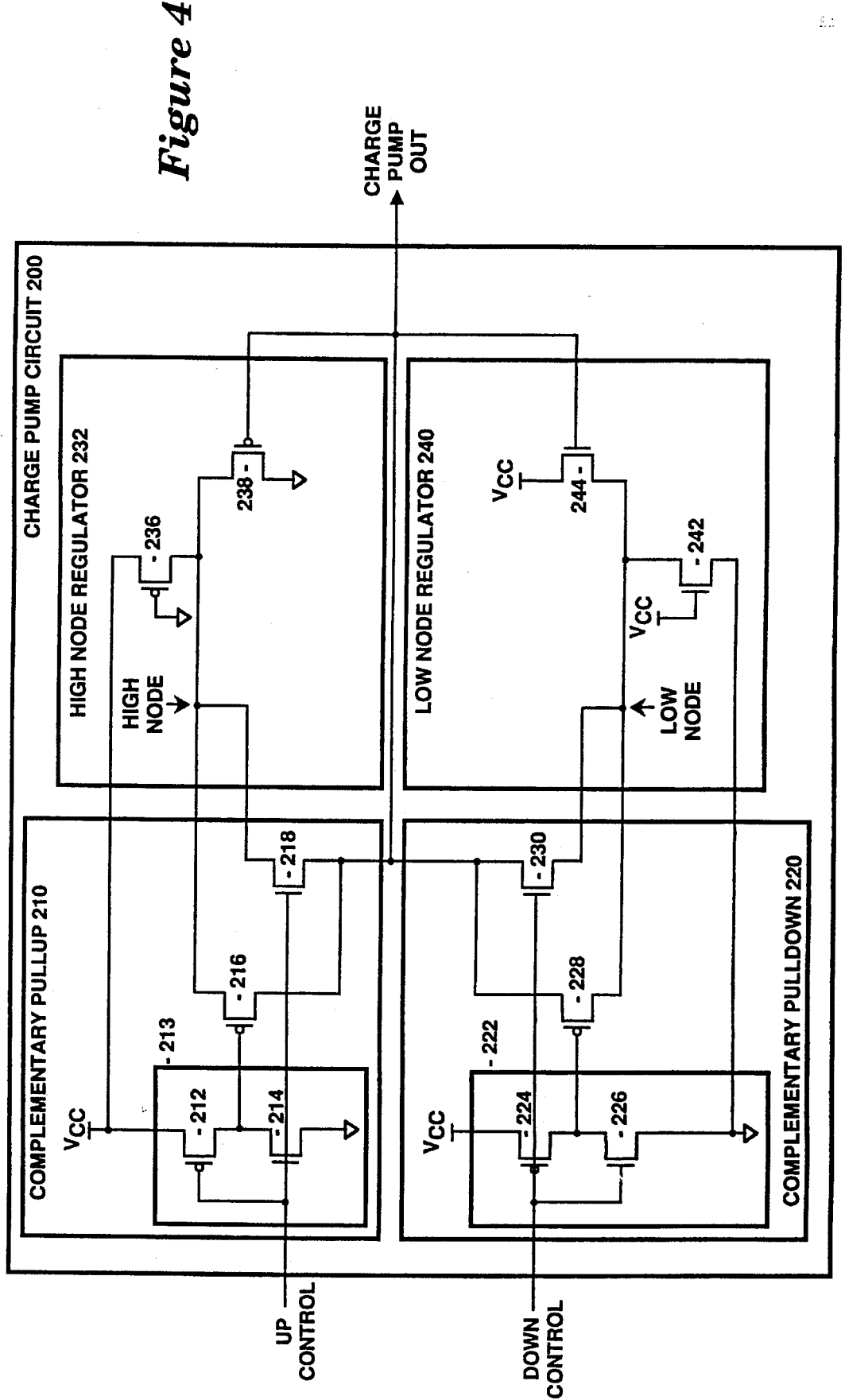
FIG. 4 illustrates a charge pump circuit configured in accordance with one embodiment of the present invention.

FIG. 4 illustrates a charge pump circuit configured in accordance with one embodiment of the present invention. For this embodiment, the charge pump circuit 200 implements the switch pass gate 110 (FIG. 3) with a complementary pull up circuit 210, and implements the switch pass gate 120 (FIG. 3) with a complementary pull down circuit 220. In general, the complementary pull up circuit 210 and complementary pull down circuit 220 are constructed as complementary switches to permit rapid assertion and deassertion of charge to and from the charge pump output.

The complementary pullup circuit 210 includes a complementary metal oxide semiconductor (CMOS) inverter 213 comprising a p-channel transistor 212 and a n-channel transistor 214. The complementary pullup circuit 210 further includes a p-channel transistor 216 and a n-channel transistor 218 that operates as a complementary switch. The CMOS inverter 213 is coupled to receive the up control signal. The output of the CMOS inverter 213 is coupled to the gate of the p-channel transistor 216. The gate of the n-channel transistor 218 is controlled directly by the up control signal. The source of p-channel transistor 216 is coupled to the high node, and the drain of p-channel 216 is coupled to the charge pump output. The drain of n-channel transistor 218 is coupled to the high node, and the source of n-channel transistor 218 is coupled to the charge pump output.

In operation, a high logic level on the up and down control signals signifies an active control signal. A high logic level up control signal biases the n-channel transistor 218 to conduct current from the high node to the charge pump output. In response to the high logic level up control signal, the CMOS inverter 213 generates a low logic level signal to bias the p-channel transistor 316 to conduct current front the high node to the charge pump output. When the up control signal transitions from a high logic level to a low logic level, both the p-channel transistor 216 and the n-channel transistor 218 are turned off. The complementary operation of the p-channel transistor 216 and the n-channel transistor 218 provides rapid deassertion of charge to the charge pump output.

The complementary pulldown circuit 220 contains a similar configuration as the complementary pullup circuit 210 except the complementary pulldown circuit 220 couples the charge pump output to the low node. The complementary pulldown circuit 220 contains a CMOS inverter 222 having a p-channel transistor 224 and a n-channel transistor 226. The complementary pulldown circuit 220 further includes a p-channel transistor 228 and n-channel transistor 230. In operation, an active high logic level down control signal biases the n-channel transistor 230 to conduct current from the charge pump output to the low node, and the inverted output of the CMOS inverter 222 biases the p-channel transistor 228 to conduct current from the charge pump output to the low node. The complementary operation of the p-channel transistor 228 and the n-channel transistor 230 provides rapid switching to deassert discharging from the charge pump output.

The complementary pullup circuit 220 and the complementary pulldown circuit 220 for the switch pass gates 110 and 120 minimizes the skew of the up and down control signals. The zero skew between the up control and down control signals generates zero charge at the charge pump output. Consequently, the charge pump circuit 100 is more immune to operating voltage and process variations.

In the charge pump circuit 200, the channel lengths in the n-channel transistors 218 and 230 and the p-channel transistors 216 and 218 are small to reduce parasitic capacitances at the charge pump output. In one embodiment, the channel aspect ratio for the n-channel transistors 218 and 230 is 2/1.6 (Z/L), wherein Z represents the channel width in microns, and L represents the channel length in microns. The channel aspect ratio for the p-channel transistors 216 and 218 is 2/1.6 (Z/L)

For the embodiment illustrated in FIG. 4, the charge pump circuit 200 implements the high node regulator 130 (FIG. 3) with a high node regulator 232, and implements the low node regulator 140 (FIG. 3) with a low node regulator 240. The high node regulator 232 comprises a p-channel transistor 236 and p-channel transistor 238. The source of the p-channel transistor 236 is coupled to the source voltage, $V_{cc}$, and the drain of p-channel transistor 236 is coupled to the high node. The source of p-channel transistor 238 is coupled to the high node, and the drain of p-channel transistor 238 is coupled to ground. The p-channel transistor 238 is controlled by the charge pump output, and the gate of p-channel transistor 236 is coupled to ground.

In operation, the p-channel transistor 236 injects current into the high node increasing the voltage at the high node. The complementary pullup 210 conducts current to the charge pump output. When the voltage at the high node becomes greater than the voltage at the charge pump output by the threshold voltage of the p-channel transistor 238, then the p-channel transistor 238 begins to conduct current. The p-channel transistor 238 dissipates excess charge at the high node to provide a regulated voltage. Consequently, the high node voltage remains one p-channel threshold voltage above the voltage at the charge pump output. In one embodiment, the p-channel transistor 238 has a threshold voltage of approximately one volt.

The low node regulator 240 contains a n-channel transistor 244 and a n-channel transistor 242. The n-channel transistor 242 is configured as a draining resistor, and the n-channel 244 is configured as a source follower pullup controlled by the output charge pump. Specifically, the drain of n-channel transistor 244 is coupled to the source voltage, $V_{cc}$, and the source of n-channel transistor is coupled to the drain of n-channel transistor 242 and the low node. The n-channel transistor 244 is controlled by the charge pump output. The drain of the n-channel transistor 242 is coupled to the low node, and the source is coupled to ground. The gate of n-channel transistor 242 is coupled to $V_{cc}$.

In operation, the complementary pulldown circuit 220 dissipates charge from the charge pump output via the n-channel drain transistor 242. As the complementary pulldown circuit 220 sinks current from the charge pump output, the voltage at the low node increases. When the voltage at the low node becomes less than the voltage at the charge pump output by the threshold voltage of the n-channel transistor 244, then the n-channel transistor 244 begins to conduct current. The n-channel transistor 244 increases the voltage at the low node to provide a regulated voltage. Consequently, the low node voltage remains one n-channel threshold voltage below the voltage at the charge pump output. In one embodiment, the n-channel transistor 244 has a threshold voltage of approximately one volt.

Figure 5:
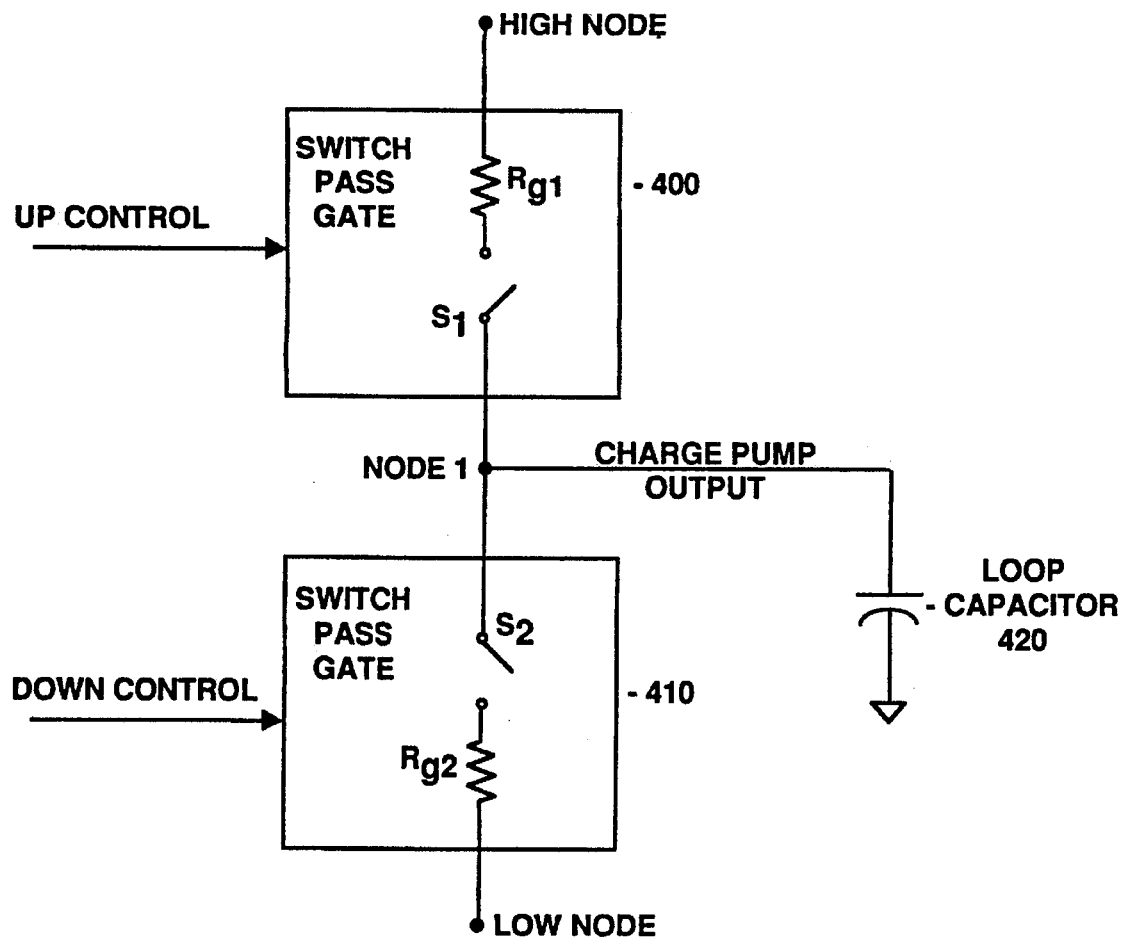
FIG. 5 conceptually illustrates the gain resistance configured in accordance with one embodiment of the present invention.

FIG. 5 conceptually illustrates the gain resistance of a charge pump circuit configured in accordance with one embodiment of the present invention. A switch pass gate 400 contains a gain resistor, $R_{g1}$, to provide the proper gain for the phase lock loop application. In addition, the switch pass gate 400 contains a switch, $S_1$, coupling the charge pump output, at node 1, to the high node. In one embodiment, the switch pass gate 400 comprises the complementary pullup circuit 210 illustrated in FIG. 4. For a switch pass gate 400 implemented as the complementary pullup circuit 210, the gain resistance $R_{g1}$ is incorporated into the n-channel transistor 218 and the p-channel transistor 216. Similarly, the switch pass gate 410 contains a switch $S_2$ and a gain resistor $R_{g2}$. In one embodiment, the switch pass gate 410 is implemented with complementary pulldown circuit 220 illustrated in FIG. 4. For the complementary pulldown circuit 220 configuration, the gain resistance $R_{g2}$ is inserted within the n-channel transistor 230 and p-channel transistor 228.

Figure 1:
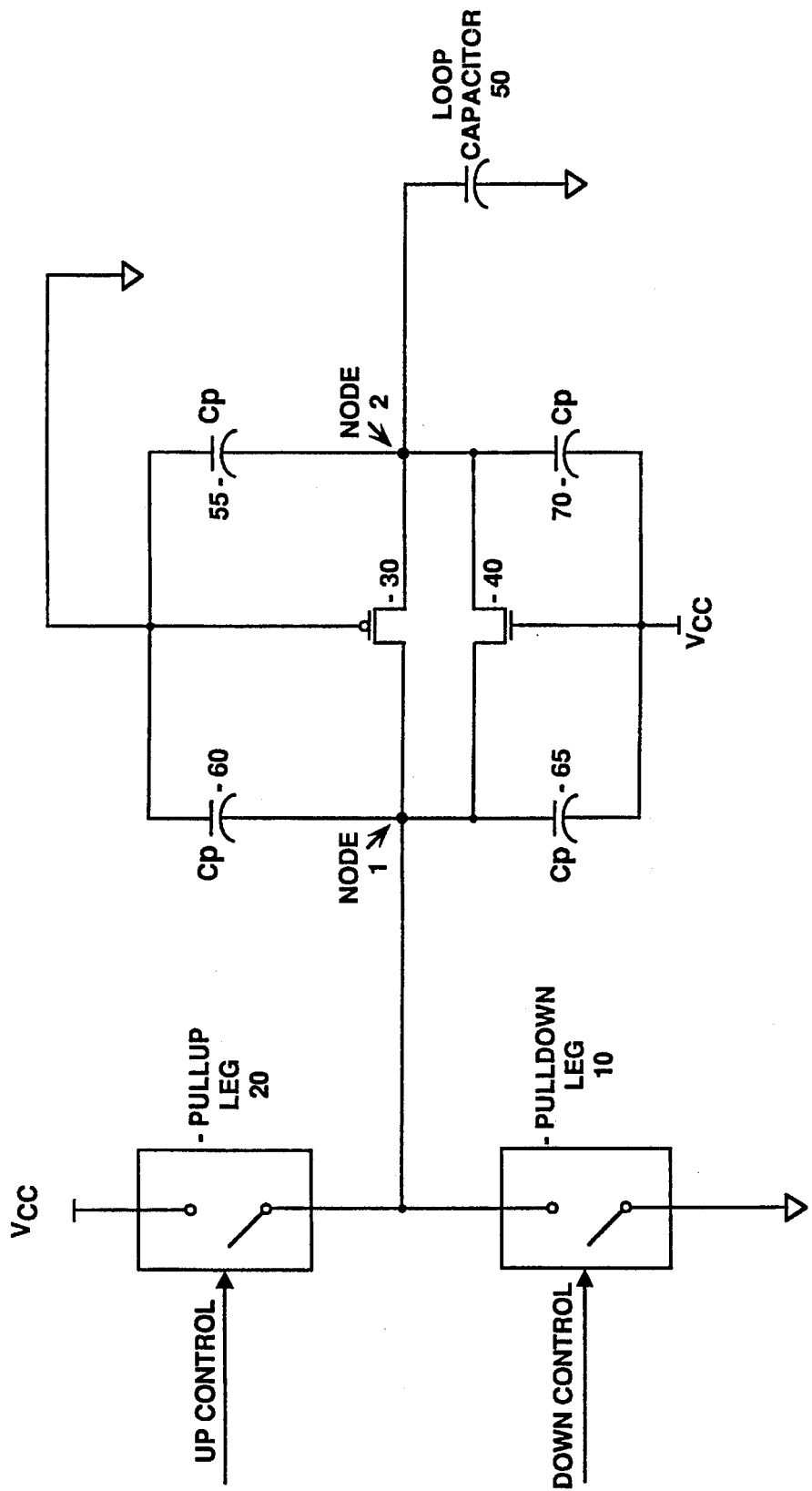
FIG. 1 illustrates a prior art charge pump circuit and loop capacitor.

The gain resistance configuration illustrated in FIG. 5 solves the problems of lazy transient behavior. Note that the charge pump output coupled to the loop capacitor 420 is generated at node 1. In the prior art circuit of FIG. 1, an additional node, node 2, was generated because the gain resistance was implemented in an additional output stage. Consequently, because the parasitic capacitance at node 2 resulted in the undesirable characteristics, node 2 is eliminated in the configuration shown in FIG. 5. In the frequency configuration, any parasitic capacitance due to the switch pass gates 400 and 410 is added to the capacitance across the loop capacitor 420. However, this parasitic capacitance has a minimal effect on the operation of the charge pump circuit because the capacitance in the loop capacitor 420 is much greater than the parasitic capacitance generated from the switch pass gates 400 and 410. Based on the gain resistance configuration of the FIG. 5, the assertion and deassertion times of pumping up and pumping down the loop capacitor 420 approach ideal wave forms.

Figure 6:
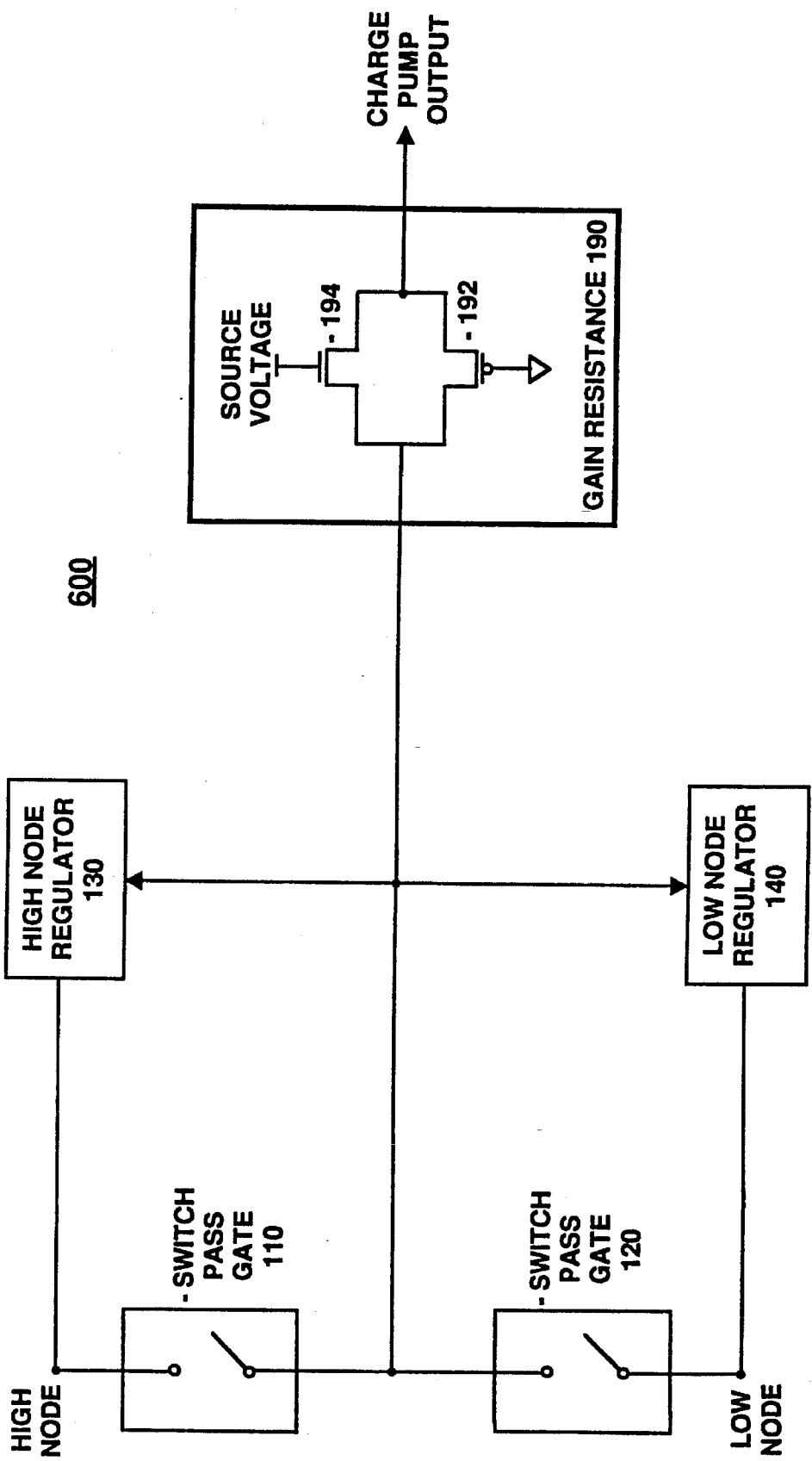
FIG. 6 illustrates the gain resistance of a charge pump circuit configured in accordance with a second embodiment of the present invention.

FIG. 6 illustrates the gain resistance of a charge pump circuit configured in accordance with a second embodiment of the present invention. A charge pump circuit 600 includes switch pass gate 110, switch pass gate 120, high node regulator 130, and low node regulator 140 as shown in FIG. 3 and as described above. In addition, the charge pump circuit 600 includes a gain resistance 190 for controlling the gain of the charge pump output circuit 600. For the embodiment illustrated in FIG. 6, the gain resistance 190 contains n-channel transistor 194 and p-channel transistor 192. The resistance generated in the gain resistance 190 is implemented via the sizing of the transistors. The sizing of transistors to generate a resistance is well known in the art and will not be described further.

Although the present invention has been described in terms of specific exemplary embodiments, it will be appreciated that various modifications and alterations might be made by those skilled in the art without departing from the spirit and scope of the invention as set forth in the following claims.

What is claimed is:

1. A charge pump circuit comprising:
    a first switch pass gate coupled to a high node and a charge pump output for coupling said high node to said charge pump output;

a second switch pass gate coupled to a low node and said charge pump output for coupling said low node to said charge pump output;

a high node regulator coupled to a source voltage for said charge pump circuit and said first switch pass gate and coupled to receive said charge pump output, for generating a high node voltage at said high node, said high node voltage being regulated above a predetermined margin of said charge pump output; and a low node regulator coupled to ground and said second switch pass gate and coupled to receive said charge pump output, for generating a low node voltage at said low node, said low node voltage being below a predetermined margin of said charge pump output.

2. The circuit as set forth in claim 1, wherein: said high node regulator comprises two p-channel transistors, a first p-channel transistor being coupled between said source voltage and said high node and a second p-channel transistor being coupled between said high node and ground and being controlled by said charge pump output so as to maintain said high node voltage one p-channel threshold voltage above said charge pump output; and said low node regulator comprises two n-channel transistors, a first n-channel transistor being coupled between said ground and said low node and a second n-channel transistor being coupled between said low node and said source voltage and being controlled by said charge pump output so as to maintain said low node voltage one n-channel threshold voltage below said charge pump output.

3. The circuit as set forth in claim 1, wherein said first switch pass gate and said second switch pass gate comprise complementary switches.

4. The circuit as set forth in claim 3, wherein said complementary switches comprise:

a first complementary metal oxide semiconductor (CMOS) inverter coupled to said up control signal and for inverting said up control signal;

a second complementary metal oxide semiconductor (CMOS) inverter coupled to said down control signal and for inverting said down control signal;

a first p-channel transistor coupled to said high node and said charge pump output and being controlled by said first CMOS inverter; and a first n-channel transistor coupled to said high node and said charge pump output and being controlled by said down control signal;

a second p-channel transistor coupled to said low node and said charge pump output and being controlled by said second CMOS inverter; and a second n-channel transistor coupled to said low node and said charge pump output and being controlled by said down control signal.

5. The circuit as set forth in claim 1, further comprising gain resistance coupled to said charge pump output for controlling the gain of said charge pump output.

6. A phase lock loop comprising:

a phase/frequency detector coupled to receive two frequency signals for generating an up control signal and a down control signal representing a phase difference between said two frequency signals;

a charge pump circuit coupled to receive said up control signal and said down control signal and for generating charge at a charge pump output in accordance with said up control signal and said down control signal, said charge pump circuit comprising:

a first switch pass gate coupled to a high node and said charge pump output for coupling said high node to said charge pump output;

a second switch pass gate coupled to a low node and said charge pump output for coupling said low node to said charge pump output;

a high node regulator coupled to a source voltage for said charge pump circuit and said first switch pass gate and coupled to receive said charge pump output, for generating a high node voltage at said high node, said high node voltage being regulated a predetermined margin above said charge pump output;

a low node regulator coupled to ground and said second switch pass gate and coupled to receive said charge pump output, for generating a low node voltage at said low node, said low node voltage being a predetermined margin below said charge pump output;

a loop capacitor coupled to said charge pump output for storing said charge; and a voltage controlled oscillator coupled to said loop capacitor for generating an output frequency locked to a first of said two frequency signals.

7. The phase lock loop as set forth in claim 6, wherein said loop capacitor comprises an on-chip capacitor.

8. The phase lock loop as set forth in claim 6, wherein:

said high node regulator comprises two p-channel transistors, a first p-channel transistor being coupled between said source voltage and said high node and a second p-channel transistor being coupled between said high node and ground and being controlled by said charge pump output so as to maintain said high node voltage one p-channel threshold voltage above said charge pump output; and said low node regulator comprises two n-channel transistors, a first n-channel transistor being coupled between said ground and said low node and a second n-channel transistor being coupled between said low node and said source voltage and being controlled by said charge pump output so as to maintain said low node voltage one n-channel threshold voltage below said charge pump output.

9. The phase lock loop as set forth in claim 6, wherein said first switch pass gate and said second switch pass gate comprise complementary switches.

10. The phase lock loop as set forth in claim 9, wherein said complementary switches comprise:

a first complementary metal oxide semiconductor (CMOS) inverter coupled to said up control signal and for inverting said up control signal;

a second complementary metal oxide semiconductor (CMOS) inverter coupled to said down control signal and for inverting said down control signal;

a first p-channel transistor coupled to said high node and said charge pump output and being controlled by said first CMOS inverter; and a first n-channel transistor coupled to said high node and said charge pump output and being controlled by said down control signal;

a second p-channel transistor coupled to said low node and said charge pump output and being controlled by said second CMOS inverter; and a second n-channel transistor coupled to said low node and said charge pump output and being controlled by said down control signal.

11. The circuit as set forth in claim 6, further comprising gain resistance coupled to said charge pump output for controlling the gain of said charge pump output.

12. A method for adding and depleting charge to and from a charge pump output, said method comprising the steps of:

generating a high node voltage at a high node, said high node voltage being regulated above a predetermined margin of said charge pump output;

generating a low node voltage at a low node, said low node voltage being below a predetermined margin of said charge pump output;

coupling said high node to said charge pump output to add charge; and coupling said low node to said charge pump output to deplete charge.

13. The method as set forth in claim 12, wherein:

the step of generating a high node voltage comprises the steps of:
coupling a first p-channel transistor between said source voltage and said high node;
coupling a second p-channel transistor between said high node and ground;
coupling said charge pump output to said second p-channel transistor so as to maintain said high node voltage one p-channel threshold voltage above said charge pump output; and the step of generating a low node voltage comprises the steps of:
coupling a first n-channel transistor between said ground and said low node;
coupling a second n-channel transistor between said low node and said source voltage; and
coupling said charge pump output to said second n-channel transistor so as to maintain said low node voltage one n-channel threshold voltage below said charge pump output.

14. The method as set forth in claim 12, wherein:

the step of coupling said high node to said charge pump output comprises the step of coupling said high node to said charge pump output with a complementary switch; and the step of coupling said low node to said charge pump output comprises the step coupling said low node to said charge pump output with a complementary switch.

15. The method as set forth in claim 14, wherein:

the step of coupling said high node to said charge pump output with a complementary switch comprises the steps of:
coupling a first complementary metal oxide semiconductor (CMOS) inverter to said up control signal;
coupling a first p-channel transistor between said high node and said charge pump output and to said first CMOS inverter;
coupling a first n-channel transistor between said high node and said charge pump output and to said down control signal;

the step of coupling said low node to said charge pump output comprises the steps of:
coupling a second complementary metal oxide semiconductor (CMOS) inverter to said down control signal;
coupling a second p-channel transistor between said low node and said charge pump output and to said second CMOS inverter; and
coupling a second n-channel transistor between said low node and said charge pump output and to said down control signal.

* * * * *